(12) United States Patent
Liu et al.

(10) Patent No.: US 11,089,189 B2
(45) Date of Patent: Aug. 10, 2021

(54) CAMERA MODULE AND TERMINAL (71) Applicant: HUAWEI TECHNOLOGIES CO., LTD., Shenzhen (CN)

(72) Inventors: Fangcheng Liu, Shenzhen (CN); Dengfeng Li, Dongguan (CN); Yingyong He, Shenzhen (CN); Yang Han, Shenzhen (CN); Lei Jiang, Tampere (FI); Jianwen Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/642,309

(22) PCT Filed: Sep. 12, 2017

(86) PCT No.: PCT/CN2017/101446
§ 371 (c)(1),
(2) Date: Feb. 26, 2020

(87) PCT Pub. No.: WO2019/051650
PCT Pub. Date: Mar. 21, 2019

(65) Prior Publication Data
US 2020/0314298 A1 Oct. 1, 2020

(51) Int. Cl.
*H04N 5/225* (2006.01)
*G02B 7/09* (2021.01)
*H04M 1/02* (2006.01)

(52) U.S. Cl.
CPC ............. *H04N 5/2253* (2013.01); *G02B 7/09* (2013.01); *H04M 1/0264* (2013.01); *H04N 5/2252* (2013.01); *H04N 5/2254* (2013.01)

(58) Field of Classification Search
CPC .. H04N 5/2253; H04N 5/2252; H04N 5/2254; G02B 7/09; G02B 7/102; G02B 7/025; H04M 1/0264
See application file for complete search history.

(56) References Cited

U.S. PATENT DOCUMENTS 7,221,524 B2 * 5/2007 Ye .................... H04N 5/2254
359/819
8,390,725 B2 3/2013 Sekimoto et al.
(Continued)

FOREIGN PATENT DOCUMENTS

CN 101520538 A 9/2009
CN 103138522 A 6/2013
(Continued)

*Primary Examiner* — Mekonnen D Dagnew
(74) *Attorney, Agent, or Firm* — Stein IP, LLC (57) ABSTRACT

A camera module includes a lens and a voice coil motor (VCM), and the lens is placed in the VCM, where a first portion of an inner side of the VCM is attached to a first portion of an outer side of the lens, and a second portion of the inner side of the VCM is provided with a screw thread structure recessed relative to the first portion of the inner side of the VCM. The screw thread structure and a second portion of the outer side of the lens form a groove portion, and the groove portion is filled with adhesive. The first portion of the VCM is a lower portion, and the second portion of the VCM is an upper portion. The first portion of the lens is a lower portion, and the second portion of the lens is an upper portion.

14 Claims, 6 Drawing Sheets

(56) References Cited

U.S. PATENT DOCUMENTS

| | | | |
|---|---|---|---|
| 2008/0037143 A1* | 2/2008 | Yoon | G02B 7/08 |
| | | | 359/824 |
| 2010/0110270 A1 | 5/2010 | Sekimoto et al. | |
| 2014/0063821 A1* | 3/2014 | Hegde | H05K 3/323 |
| | | | 362/382 |
| 2015/0271372 A1 | 9/2015 | Sekimoto | |
| 2015/0281528 A1* | 10/2015 | Li | H04N 5/2252 |
| | | | 348/357 |
| 2015/0370034 A1 | 12/2015 | Kasuga | |
| 2017/0034442 A1 | 2/2017 | Kim et al. | |
| 2017/0146767 A1 | 5/2017 | Sekimoto et al. | |

FOREIGN PATENT DOCUMENTS

| | | |
|---|---|---|
| CN | 103378702 A | 10/2013 |
| CN | 102798959 B | 10/2014 |
| CN | 104469107 A | 3/2015 |
| CN | 105842867 A | 8/2016 |
| CN | 105898125 A | 8/2016 |
| CN | 206362987 U | 7/2017 |
| CN | 206892431 U | 1/2018 |
| EP | 2096475 B1 | 1/2017 |
| JP | 2009031694 A | 2/2009 |
| JP | 2010134409 A | 6/2010 |
| JP | 2010230910 A | 10/2010 |
| JP | 2016148812 A | 8/2016 |
| KR | 20080110957 A | 12/2008 |
| KR | 20100023118 A | 3/2010 |
| KR | 20100052083 A | 5/2010 |
| WO | 2014122849 A1 | 8/2014 |

\* cited by examiner

FIG. 1

--PRIOR ART--

FIG. 2

--PRIOR ART--

CAMERA MODULE AND TERMINAL

CROSS-REFERENCE TO RELATED APPLICATIONS

This application is a national stage of International Application No. PCT/CN2017/101446, filed on Sep. 12, 2017, which is hereby incorporated by reference in its entirety.

TECHNICAL FIELD

Embodiments of the present invention relate to a camera module and a terminal.

BACKGROUND

Figure 1:
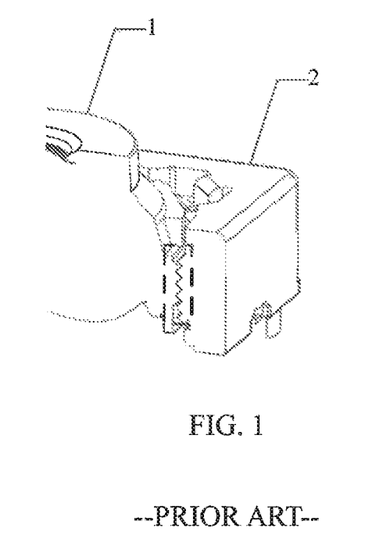
FIG. 1 illustrates a screw-in structure according to the Background.

In order to better fit a voice coil motor (Voice Coil Motor, VCM) to a lens (Lens), a screw-in structure shown in FIG. 1 may be used. In this structure, a preliminary binding force is provided mainly by mating of screw threads between the voice coil motor and the lens, and reinforcement is provided by adhesive dispensed from a top of the screw-in structure. In this way, an outer surface of the lens is fastened onto an inner surface of the voice coil motor, binding the lens and the voice coil motor together.

Figure 2:
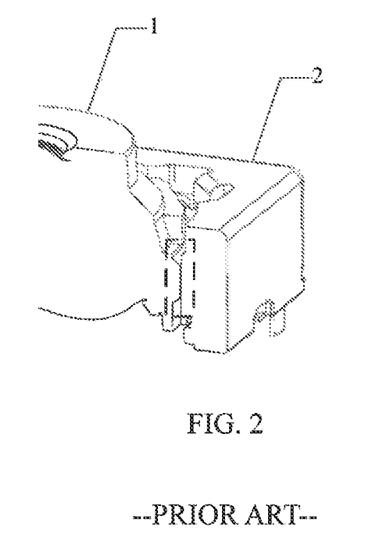
FIG. 2 illustrates a screw-free smooth surface structure according to the Background.

However, with emerging technologies such as wide aperture and optical image stabilization (OIS) for cameras/video cameras, the foregoing screw-in structure is insufficient to ensure optical axis alignment precision, making it pretty hard to meet a demand of reducing "black shadows and black spots" in a picture during imaging. Therefore, a screw-free smooth surface structure is developed. FIG. 2 shows a screw-free smooth surface structure. This structure, in combination with a pre-assembled auto alignment (AA) device, effectively resolves a problem of optical axis precision, and brings about an additional benefit of camera/video camera size reduction in X and Y directions (the screw-in structure leads to an excessively large module size because the screw threads occupy large space in the X and Y directions). In addition, a problem of "black shadows and black spots" is relieved to some extent.

However, with increasing use of the screw-free smooth surface structure, a disadvantage of this structure is emerging. That is, an insufficient adhesive binding force between a lens and a voice coil motor leads to poor focusing of a module.

SUMMARY

Embodiments of the present invention provide a camera module and a terminal, to resolve a problem of poor focusing of a module due to an insufficient adhesive binding force between a lens and a voice coil motor.

According to a first aspect, an embodiment of the present invention provides a camera module, where the camera module includes a lens and a voice coil motor, and the lens is placed in the voice coil motor. A first portion of an inner side of the voice coil motor is attached to a first portion of an outer side of the lens. A second portion of the inner side of the voice coil motor is provided with a screw thread structure recessed relative to the first portion of the inner side of the voice coil motor, the screw thread structure and a second portion of the outer side of the lens form a groove portion, and the groove portion is filled with adhesive. The first portion of the inner side of the voice coil motor is a lower portion of the inner side of the voice coil motor, and the second portion of the inner side of the voice coil motor is an upper portion of the inner side of the voice coil motor. The first portion of the outer side of the lens is a lower portion of the outer side of the lens, and the second portion of the outer side of the lens is an upper portion of the outer side of the lens. In this embodiment of the present invention, a screw thread on the inner side of the voice coil motor is used as an adhesive overflow groove. To be specific, a binding force between the lens and the voice coil motor is mainly provided by the adhesive. In addition, during adhesive dispensing, the adhesive may permeate through the adhesive overflow groove, effectively increasing a binding force between the adhesive and the voice coil motor. This resolves a problem of poor focusing of a module due to an insufficient adhesive binding force between a lens and a voice coil motor.

In a possible design, a proportion of the first portion of the inner side of the voice coil motor in the inner side of the voice coil motor equals a proportion of the second portion of the inner side of the voice coil motor in the inner side of the voice coil motor. This means that the first portion of the inner side of the voice coil motor and the second portion of the inner side of the voice coil motor each occupy a half of the inner side of the voice coil motor. In this way, the lens and the voice coil motor can be assembled as firmly as possible under a premise of facilitating assembly of the voice coil motor and the lens. In addition, this equal-division design solution also reduces the adhesive while ensuring an assembly and imaging effect. That is, this design solution balances requirements for assembly firmness and assembly costs.

In a possible design, the outer side of the lens has a screw-free smooth surface structure.

In a possible design, the outer side of the lens is provided with at least one groove wrapping around the outer side of the lens, and the groove is filled with the adhesive. In this way, during adhesive dispensing, the adhesive may permeate through both the adhesive overflow groove provided on the voice coil motor and an adhesive overflow groove provided on the lens, forming a binding force with the voice coil motor and the lens, respectively, thereby increasing the adhesive binding force between the voice coil motor and the lens.

In a possible design, the screw thread structure has a single-start or double-start thread form, where a thread type of the single-start or double-start thread form and a type of the groove include at least one of the following: a triangle, a rectangle, a trapezoid, a sawtooth, and a pipe thread.

In a possible design, a thread depth is greater than or equal to 0.2 millimeter and less than or equal to 0.5 millimeter. A deeper thread indicates a better fastening effect. On the contrary, a shallower thread indicates a relatively poor fastening effect.

In a possible design, the screw thread structure has at least one and at most five screw thread turns. Both adhesive consumption and the fastening effect are positively correlated with a quantity of screw thread turns. To be specific, a larger quantity of screw thread turns indicates higher adhesive consumption but a better fastening effect. On the contrary, a smaller quantity of screw thread turns indicates less adhesive but a relatively poor fastening effect.

In a possible design, the adhesive is thermosetting adhesive.

According to a second aspect, an embodiment of the present invention provides a terminal, where the terminal includes the camera module according to any one of the first aspect or the possible designs of the first aspect.

Reference numerals in the accompanying drawings are described as follows:

1—Lens,
2—Voice coil motor,
3—First portion of an inner side of the voice coil motor 2,
4—First portion of an outer side of the lens 1,
5—Second portion of the inner side of the voice coil motor 2,
6—Screw thread structure,
7—Second portion of the outer side of the lens 1,
8—Groove portion,
9—Bottom of the groove portion 8,
10—Groove on the outer side of the lens 1,
11—Upper surface of the groove 10,
12—Lower surface of the groove 10,
13—Assembly jig,
14—Groove of the assembly jig 13, and
15—Support frame.

DESCRIPTION OF EMBODIMENTS

The following describes the technical solutions in the embodiments of the present invention with reference to the accompanying drawings in the embodiments of the present invention.

Figure 3:
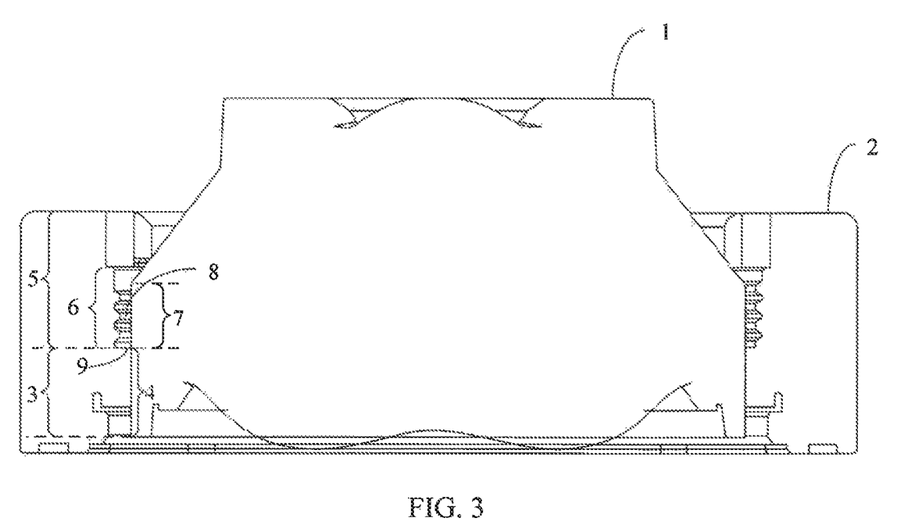
FIG. 3 is a sectional view of a camera module according to an embodiment of the present invention.

FIG. 3 is a sectional view of a camera module according to an embodiment of the present invention. The camera module includes a lens 1 and a voice coil motor 2. After the lens 1 is placed in the voice coil motor 2, a first portion 3 of an inner side of the voice coil motor 2 is attached to a first portion 4 of an outer side of the lens 1. A second portion 5 of the inner side of the voice coil motor 2 is provided with a screw thread structure 6 recessed relative to the first portion 3 of the inner side of the voice coil motor 2, and the screw thread structure 6 and a second portion 7 of the outer side of the lens 1 form a groove portion 8. A side of the groove portion 8 that is near the voice coil motor 2 has the screw thread structure 6, and a side of the groove portion 8 that is near the lens 1 may have a screw-free smooth surface structure. In this embodiment of the present invention, a manner of adhesive dispensing may be used to dispense adhesive from a top of the groove portion 8, so that the adhesive flows along side walls (to be specific, the screw thread structure 6 and the second portion 7 of the outer side of the lens 1) of the groove portion 8 to a bottom 9 of the groove portion 8, to fill up the groove portion 8.

The first portion 3 of the inner side of the voice coil motor 2 is a lower portion of the inner side of the voice coil motor 2, and the second portion 5 of the inner side of the voice coil motor 2 is an upper portion of the inner side of the voice coil motor 2. The first portion 4 of the outer side of the lens 1 is a lower portion of the outer side of the lens 1, and the second portion 7 of the outer side of the lens 1 is an upper portion of the outer side of the lens 1.

In the camera module according to this embodiment of the present invention, an adhesive filling position is the groove portion 8 that is formed by the screw-free smooth surface structure of the lens 1 and the screw thread structure 6 that is recessed and provided in the voice coil motor 2. Because there is no screw-in structure, assembly difficulties during assembly of the lens 1 and the voice coil motor 2 can be effectively reduced. In addition, during the assembly of the lens 1 and the voice coil motor 2, only the first portion 4 of the outer side of the lens 1 comes in contact with the first portion 3 of the inner side of the voice coil motor 2, thereby effectively using an advantage of convenient assembly brought about by the screw-free smooth surface structure. In addition, this fitting structure is free of friction between inner and outer screw threads that is brought about by a screw-in structure, and therefore has no debris resulting from mutual twisting and squeezing between screw threads. In this way, a risk of particle formation is relatively low. A particle refers to debris or dust in an imaging area and results in "a black shadow or a black spot" in a corresponding area in a picture during imaging. When the lens 1 is closely attached to the voice coil motor 2, contact surfaces are the first portion 4 of the outer side of the lens 1 and the first portion 3 of the inner side of the voice coil motor 2, making a joint clearance small, thereby helping improve positioning precision. In addition, with the provided screw thread structure 6, it can be ensured that, during adhesive dispensing, the adhesive fills up each tooth of the screw thread structure 6. That is, the adhesive can be contained in the tooth, thereby increasing an adhesion force between the lens 1 and the voice coil motor 2.

Figure 4:
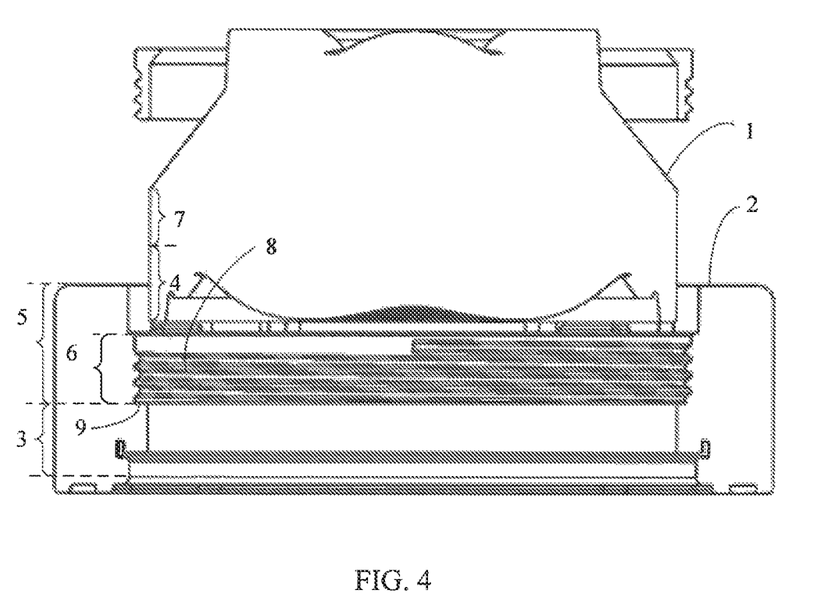
FIG. 4 is a schematic diagram of fitting a lens into a voice coil motor according to an embodiment of the present invention.

It should be noted that, in this embodiment of the present invention, the screw thread structure 6 may be provided as a shallow screw thread structure, that is, a screw thread structure with a relatively small thread doth. For example, a thread depth is set to be 0.2 to 0.5 millimeter (mm). In this way, dimensions in X and Y directions are effectively reduced for the fitting structure and therefore a volume of the fitting structure is decreased. This improves optical axis precision. FIG. 4 is a schematic diagram of fitting a lens into a voice coil motor according to an embodiment of the present invention. After the lens 1 and the voice coil motor 2 are assembled and adhesive dispensing is completed, a layer of adhesive that has the screw thread structure 6 is formed along an outer surface of the second portion 7 of the outer side of the lens 1. That is, a binding adhesive is formed between the lens 1 and the voice coil motor 2. This means that, after the annular groove portion 8 that is formed between the lens 1 and the voice coil motor 2 and wraps around the outer side of the lens 1 is filled up with adhesive, the adhesive coincides to the groove portion 8. To be specific, a side of the adhesive that is near the voice coil motor 2 has a screw thread structure, and after the adhesive is cured, the adhesive and the screw thread structure 5 of the voice coil motor 2 are embedded into each other; a side of the adhesive that is near the lens 1 has a screw-free smooth surface structure and is attached to the lens 1.

A shape formed by the binding adhesive depends on a structure of the groove portion 8 that is formed by the assembled lens 1 and the voice coil motor 2, and when each screw thread has a given width, a depth of the groove portion 8 relative to a horizontal plane depends on a quantity of screw threads of the screw thread structure 6. Therefore, it may be considered that, when the screw thread structure 6 has a larger quantity of screw threads, the adhesive formed after the adhesive dispensing has a better fastening effect between the lens 1 and the voice coil motor 2 because a filling area is large enough.

In a screw-in structure in the prior art, both a lens 1 and a voice coil motor 2 have a screw thread. Such a screw thread structure features close matching between the lens 1 and the voice coil motor 2, but increases assembly difficulties and has relatively low precision. To be specific, for mounting the lens 1 to the voice coil motor 2, an actual mounting position differs greatly from a theoretical design position. The screw-in structure provides most binding force, and a binding force provided by adhesive merely has a supplementary function. In a screw-free smooth surface structure in the prior art, neither a lens 1 nor a voice coil motor 2 has a screw thread. This means that, the lens 1 is fitted to the voice coil motor 2 through adhesive dispensing between two smooth surfaces, and adhesive provides a primary binding force between the lens 1 and the voice coil motor 2. However, in the present embodiment of the present invention, the lens 1 is provided with no screw thread, and only screw threads on an inner side of the voice coil motor 2 are used as an adhesive overflow groove. This means that a binding force between the lens 1 and the voice coil motor 2 is mainly provided by the adhesive. In addition, during adhesive dispensing, the adhesive may permeate through the adhesive overflow groove, to enhance a binding force between the adhesive and the voice coil motor 2.

Figure 5:
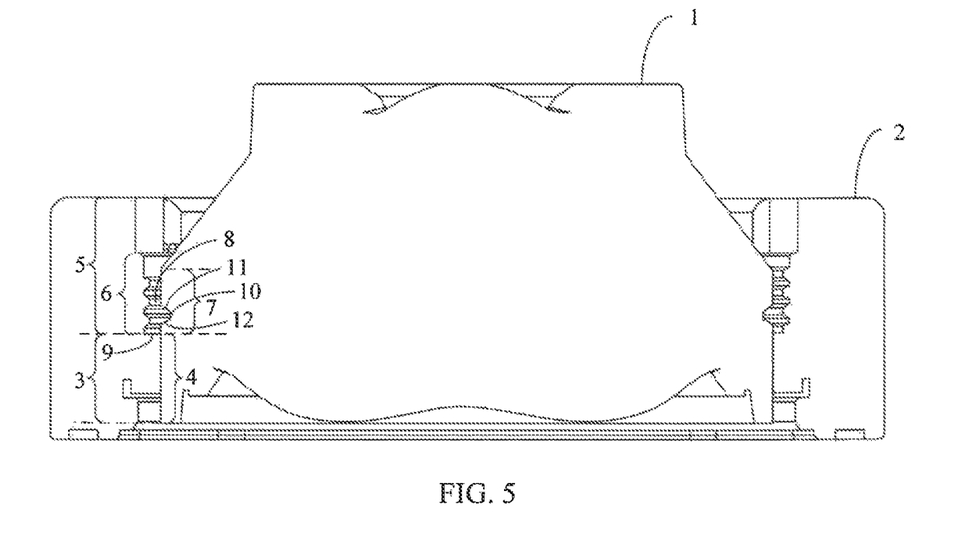
FIG. 5 is a sectional view of another camera module according to an embodiment of the present invention.
Figure 6:
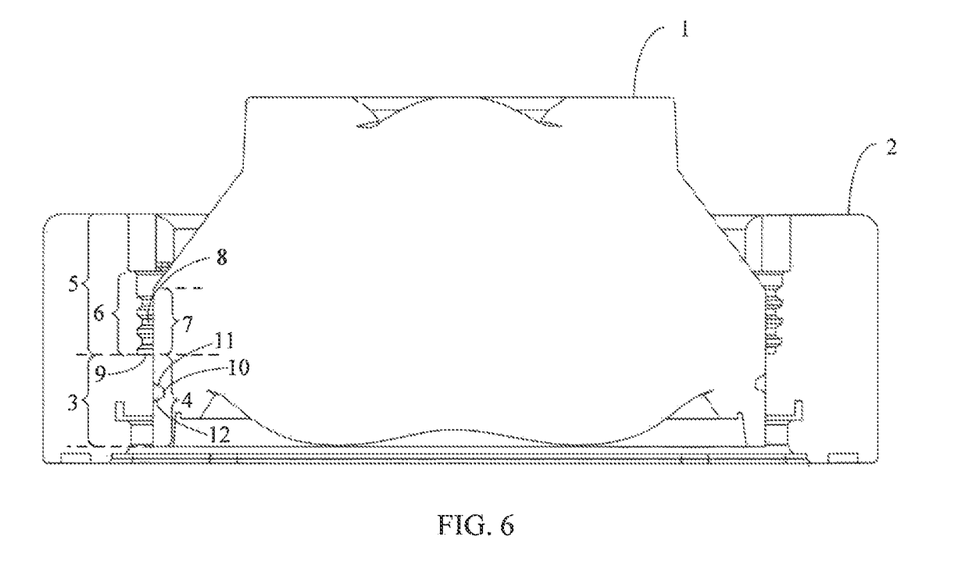
FIG. 6 is a sectional view of another camera module according to an embodiment of the present invention.

FIG. 5 is a sectional view of another camera module according to an embodiment of the present invention. To be specific, on a basis of the fitting structure shown in FIG. 3, a groove 10 is added to a second portion 7 of an outer side of a lens 1. It should be noted that a position for providing the groove 10 is not limited to a position shown in FIG. 5. In this embodiment of the present invention, the groove 10 may be provided at a position opposite to a screw thread structure 6, that is, the screw thread structure 6, the groove 10, and a first portion 4 of the outer side of the lens 1 together form a groove portion 8. As shown in FIG. 6, the groove 10 may alternatively be provided at a position not opposite to the screw thread structure 6, that is, the groove 10 is provided at a position that is opposite to a first portion 3 of an inner side of a voice coil motor 2.

Whether the groove 10 is located at the position shown in FIG. 5 or at the position shown in FIG. 6, the groove 10 acts to increase an adhesive binding force between cured adhesive and the outer side of the lens 1. Compared with the position of the groove 10 shown in FIG. 5, as shown in FIG. 6, when the first portion 4 of the outer side of the lens 1 is closely attached to the first portion 3 of the inner side of the voice coil motor 2, it is very difficult to fill up the groove 10 with the adhesive after the adhesive is injected. This means that the position for providing the groove 10 shown in FIG. 6 can merely improve the adhesive binding force between the cured adhesive and the outer side of the lens 1 to some extent. Therefore, compared with the position for providing the groove 10 shown in FIG. 6, apparently, the position for providing the groove 10 shown in FIG. 5 can further increase firmness of assembly of the lens 1 and the voice coil motor 2.

In addition, in this embodiment of the present invention, a thread and the groove are two different structures. The thread means a spiral continuous convex or concave part that has a specific cross section and is made on a cylindrical surface. If the thread wraps around the cylindrical surface by only one turn, a start position and an end position of the thread are staggered by some distance. This means that, when the thread wraps around the cylindrical surface by only one turn, a track traveled by the thread cannot be fully joined. On the contrary, the groove means a loop of continuous concave part that has a specific cross section and that is made on the cylindrical surface. If the groove wraps around the cylindrical surface by only one turn, a start position and an end position of the groove are fully joined, forming a gully wrapping around the cylindrical surface by one turn.

It should be noted that an upper surface 11 and a lower surface 12 of the groove 10 may be arranged as planes parallel to a horizontal plane or at an angle to the horizontal plane. FIG. 5 and FIG. 6 each show only one possible structure, and no limitation is imposed herein.

Using the structure shown in FIG. 5 as an example, in a process in which the adhesive is dispensed from a top of the groove portion 8, so that the adhesive flows along side walls of the groove portion 8 to a bottom 9 of the groove portion 8, to fill up the groove portion 8, the adhesive fills both the screw thread structure 6 and the groove 10. In this way, the adhesive is closely attached not only to the voice coil motor 2, but also to the lens 1 because of the presence of the groove 10. To be specific, the cured adhesive forms screw-in structures with the lens 1 and the voice coil motor 2 respectively, to reinforce the adhesive and the lens 1, and reinforce the adhesive and the voice coil motor 2. Compared with the camera module shown in FIG. 3, the camera module shown in FIG. 5 is firmer because the groove 10 is provided on the second portion 7 of the outer side of the lens 1.

It should be noted that in this embodiment of the present invention, no limitation is imposed on a quantity of the grooves 10 provided on the first portion 4 of the outer side of the lens 1. The groove 10 may be, for example, a concave groove portion wrapping around an outer surface of the lens 1 by one turn, or a plurality of discrete points arranged at a given step and wrapping around an outer surface of the lens 1 by one turn, that is, each of the independent grooves 10 may be considered as a recessed area. Certainly, the groove 10 may be provided on the second portion 7 of the outer side of the lens 1, as shown in FIG. 5, or on the first portion 4 of the outer side of the lens 1, as shown in FIG. 6. Alternatively, at least one groove that is adjacent to the groove 10 from top or bottom and that is similar to or the same as the groove 10 in structure may be provided, and no limitation is imposed herein.

In another possible implementation provided by this embodiment of the present invention, the screw thread structure 6 may have a single-start or double-start thread form. If a plurality of grooves 10 are provided on the outer side of the lens 1 and the plurality of grooves 10 are adjacent to each other and form a structure similar to the screw thread structure 6, the structure may alternatively have a single-start or double-start thread form, and no limitation is imposed herein. Types of threads of the screw thread structure 6 may be completely the same, completely different, or partially the same. The thread type of the screw thread structure 6 and a type of the groove 10 may be any one of the following: a triangle, a rectangle, a trapezoid, a saw-tooth, and a pipe thread, or certainly may be another type. This is not limited herein. For the screw thread structure 6, a quantity of screw thread turns may be determined according to a current requirement for a fastening effect of fastening between the lens 1 and the voice coil motor 2. Usually, the quantity of screw thread turns may be set to 1 to 5. Generally, both adhesive consumption and the fastening effect are positively correlated with the quantity of screw thread turns. To be specific, a larger quantity of screw thread turns indicates higher adhesive consumption but a better fastening effect. On the contrary, a smaller quantity of screw thread turns indicates less adhesive but a relatively poor fastening effect. In addition, a thread depth of the screw thread structure 6 may affect the fastening effect. A deeper thread indicates a better fastening effect. On the contrary, a shallower thread indicates a relatively poorer fastening effect.

After the lens 1 and the voice coil motor 2 are assembled, UV thermosetting adhesive or another type of thermosetting adhesive is dispensed to a juncture between the lens 1 and the voice coil motor 2, and cured by heating and baking. Using FIG. 3 as an example, a gear or snap joint structure is formed between the cured adhesive and the screw thread structure 6. Initially, the groove portion 8 is empty. Then, the adhesive is filled into the groove portion 8. After the adhesive is solidified, there is a gear structure between the screw thread structure 6 and the second portion 7 of the outer side of the lens 1. In this way, the adhesive can be closely attached to the voice coil motor 2. Similarly, using FIG. 5 and FIG. 6 as examples, a snap structure is formed between the cured adhesive and the screw thread structure 6, and a snap structure is formed between the cured adhesive and the groove 10. In this way, the adhesive can be closely attached to the lens 1 and the voice coil motor 2, respectively. This means that the adhesive may increase a binding force in a vertical direction. According to FIG. 3, the adhesive on a voice coil motor 2 side is provided with an adhesive container, thereby greatly increasing a binding force of the adhesive. As a result, there is no torque matching during assembly, making the assembly easy. In addition, no process particle is generated because there is no mutual twisting and squeezing between screw threads during assembly. According to FIG. 5 and FIG. 6, based on FIG. 3, the adhesive near a lens 1 side flows into an adhesive container that is provided on the outer side of the lens 1, further increasing the binding force of the adhesive.

Figure 7:
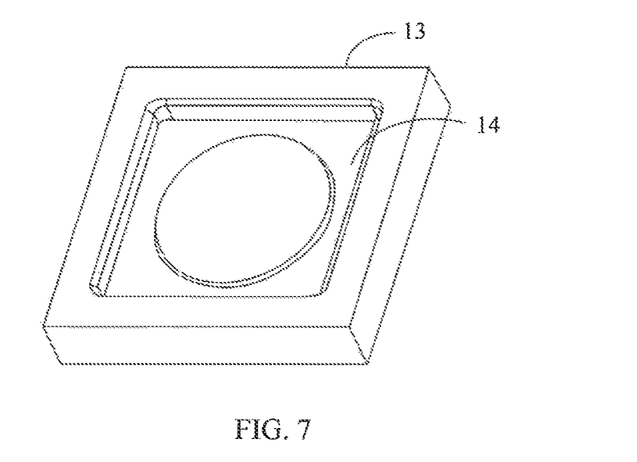
FIG. 7 is a schematic structural diagram of an assembly jig according to an embodiment of the present invention.
Figure 8:
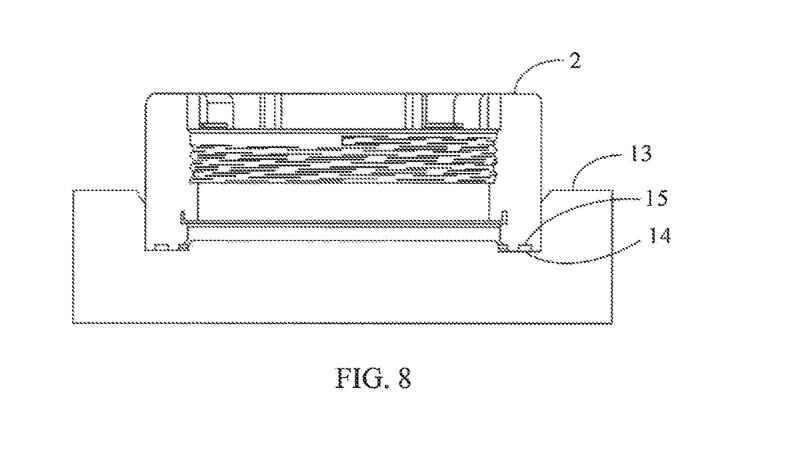
FIG. 8 is a schematic structural diagram f fixing a voice coil motor into an assembly jig, according to an embodiment of the present invention.
Figure 9:
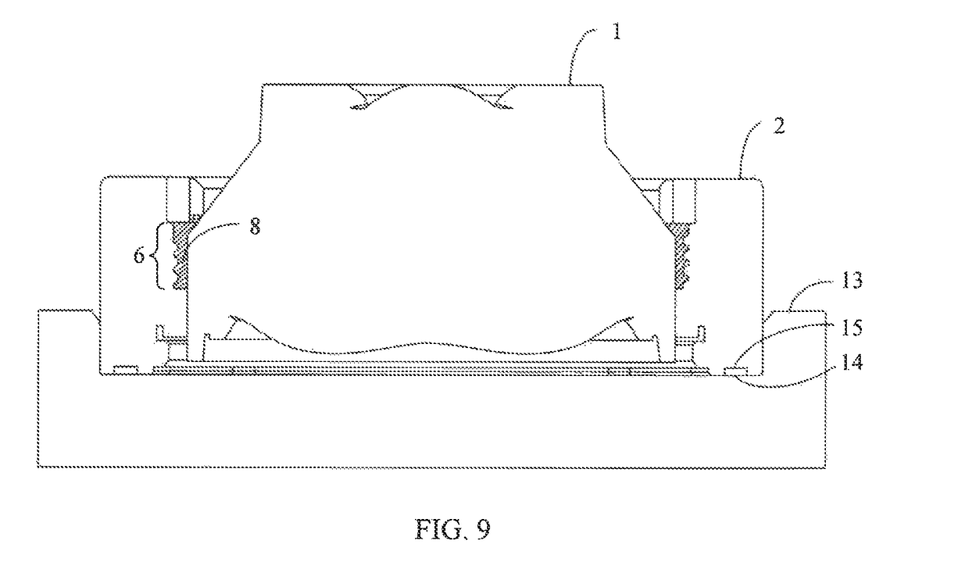
FIG. 9 is a schematic structural diagram of a fitting structure obtained through adhesive dispensing according to an embodiment of the present invention.
Figure 10:
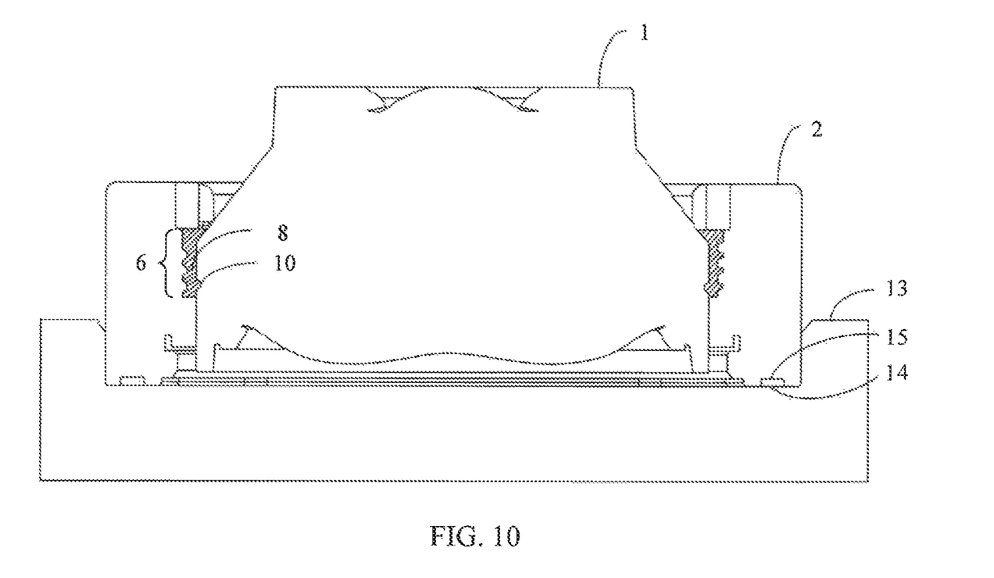
FIG. 10 is a schematic structural diagram of another fitting structure obtained through adhesive dispensing according to an embodiment of the present invention.

In an assembly process of the lens 1 and the voice coil motor 2, an assembly jig 13 for the lens 1 and the voice coil motor 2 needs to be first placed on an assembly device. The assembly jig 13 may have a structure shown in FIG. 7. In this embodiment of the present invention, a type of the assembly jig 13 is not limited. As shown in FIG. 8, groove 14 on an upper surface of the assembly jig 13 can be snap-fitted to a support frame 15 on a lower part of the voice coil motor 2. That is, the voice coil motor 2 may be fastened to the assembly jig 13. A cleaned voice coil motor 2 may be installed in the assembly jig 13. Subsequently, a cleaned lens 1 is installed in the voice coil motor 2. The assembly jig 13 is used to restrict displacement of the voice coil motor 2 during assembling, that is, to restrict a position of the voice coil motor 2. The adhesive is dispensed and cured in a gap between the lens 1 and the voice coil motor 2, that is, the groove portion 8 formed by the lens 1 and the voice coil motor 2. FIG. 8 shows a process of implementing adhesive dispensing and curing on a basis of the fitting structure shown in FIG. 3. FIG. 9 shows a process of implementing adhesive dispensing and curing on a basis of the fitting structure shown in FIG. 5. It should be noted that FIG. 6 is similar to FIG. 5, and details are not described herein again. In these figures, a shaded area indicates a part that is filled with the adhesive.

It should be noted that, in the foregoing embodiments, to prevent the adhesive from overflowing from the groove portion 8 and affecting the matching between the lens 1 and the voice coil motor 2, in this embodiment of the present invention, a groove may be provided under the first portion 4 of the outer side of the lens 1, and/or under the first portion 3 of the inner side of the voice coil motor 2, to serve as an adhesive overflow groove.

In addition, in an actual assembly process of the lens 1 and the voice coil motor 2, a proportion of the first portion 3 of the inner side of the voice coil motor 2 to the second portion 5 of the inner side of the voice coil motor 2 in the inner side of the voice coil motor 2 may be freely allocated during design of the voice coil motor 2. Therefore, in this embodiment of the present invention, a design person may make consideration based on a current actual camera module requirement. A larger proportion of the second portion 5 of the inner side of the voice coil motor 2 indicates a smaller proportion of the first portion 3 of the inner side of the voice coil motor 2, a larger contact area between the provided screw thread structure 6 and the adhesive indicates a larger binding force between the voice coil motor 2 and the cured adhesive, that is, a better fastening effect between the voice coil motor 2 and the lens 1. A larger proportion of the first portion 3 of the inner side of the voice coil motor 2 means a smaller proportion of the second portion 5 of the inner side of the voice coil motor 2. In this case, the contact area between the provided screw thread structure 6 and the adhesive is relatively small, but a contact area between the closely attached lens 1 and the voice coil motor 2 is larger, thereby increasing the joint area between the lens 1 and the voice coil motor 2 to a greatest extent while facilitating assembly. In addition, because the contact area between the provided screw thread structure 6 and the adhesive is relatively small, the groove portion 8 occupies relatively small space, thereby reducing the adhesive during adhesive dispensing.

According to an example solution, when the proportion of the first portion 3 of the inner side of the voice coil motor 2 equals the proportion of the second portion 5 of the inner side of the voice coil motor 2 in the inner side of the voice coil motor 2, to be specific, the first portion 3 of the inner side of the voice coil motor 2 and the second portion 5 of the inner side of the voice coil motor 2 each occupy a half of the inner side of the voice coil motor 2. Thus, the lens 1 and the voice coil motor 2 can be assembled as firmly as possible under a premise of facilitating assembly of the voice coil motor 2 and the lens 1. In addition, this equal-division design solution also reduces the adhesive while ensuring an assembly and imaging effect. That is, this design solution balances requirements for assembly firmness and assembly costs.

Figure 11:
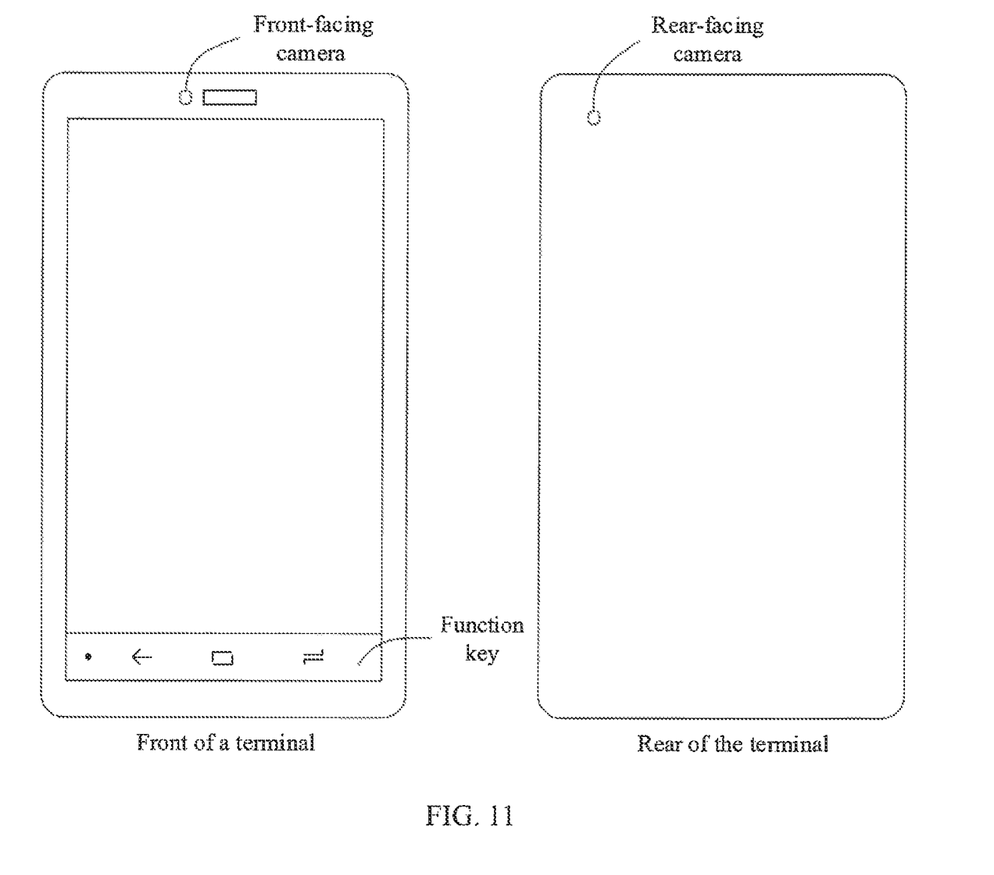
FIG. 11 is a schematic structural diagram of a terminal according to an embodiment of the present invention.

An embodiment of the present invention provides a terminal, where the terminal includes at least one of the camera modules shown in FIG. 3 to FIG. 6. For an assembly method of the camera module provided on the terminal, refer to the foregoing embodiments. Details are not described herein again. It should be noted that, as shown in FIG. 11, the terminal may be provided with at least one of the camera modules. For example, the camera module may be a portion of a front-facing camera of the terminal and/or a portion of a rear-facing camera of the terminal, and no limitation is imposed herein.

The foregoing descriptions are merely specific implementations of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A camera module, comprising:
a lens; and
a voice coil motor (VCM),
wherein:
the lens is placed in the voice coil motor,
  a first portion of an inner side of the voice coil motor is attached to a first portion of an outer side of the lens,
  a second portion of the inner side of the voice coil motor is provided with a screw thread structure recessed relative to the first portion of the inner side of the voice coil motor, the screw thread structure and a second portion of the outer side of the lens form a groove portion, and the groove portion is filled with adhesive, and
  the first portion of the inner side of the voice coil motor is a lower portion of the inner side of the voice coil motor, the second portion of the inner side of the voice coil motor is an upper portion of the inner side of the voice coil motor, the first portion of the outer side of the lens is a lower portion of the outer side of the lens, and the second portion of the outer side of the lens is an upper portion of the outer side of the lens.

2. The camera module according to claim 1, wherein a proportion of the first portion of the inner side of the voice coil motor in the inner side of the voice coil motor equals a proportion of the second portion of the inner side of the voice coil motor in the inner side of the voice coil motor.

3. The camera module according to claim 1, wherein the outer side of the lens has a screw-free smooth surface structure.

4. The camera module according to claim 1, wherein the outer side of the lens is provided with at least one groove wrapping around the outer side of the lens, and the groove is filled with the adhesive.

5. The camera module according to claim 4, wherein the screw thread structure has a single-start or double-start thread form, wherein a thread type of the single-start or double-start thread form and a type of the groove comprise at least one of the following: a triangle, a rectangle, a trapezoid, a sawtooth, or a pipe thread.

6. The camera module according to claim 5, wherein a thread depth is greater than or equal to 0.2 millimeter and less than or equal to 0.5 millimeter.

7. The camera module according to claim 1, wherein the screw thread structure has at least one and at most five screw thread turns.

8. A terminal, comprising:
a camera module comprising:
  a lens and a voice coil motor (VCM), and the lens is placed in the voice coil motor, wherein:
    a first portion of an inner side of the voice coil motor is attached to a first portion of an outer side of the lens,
    a second portion of the inner side of the voice coil motor is provided with a screw thread structure recessed relative to the first portion of the inner side of the voice coil motor, the screw thread structure and a second portion of the outer side of the lens form a groove portion, and the groove portion is filled with adhesive, and
  the first portion of the inner side of the voice coil motor is a lower portion of the inner side of the voice coil motor, the second portion of the inner side of the voice coil motor is an upper portion of the inner side of the voice coil motor, the first portion of the outer side of the lens is a lower portion of the outer side of the lens, and the second portion of the outer side of the lens is an upper portion of the outer side of the lens.

9. The terminal according to claim 8, wherein a proportion of the first portion of the inner side of the voice coil motor in the inner side of the voice coil motor equals a proportion of the second portion of the inner side of the voice coil motor in the inner side of the voice coil motor.

10. The terminal according to claim 8, wherein the outer side of the lens has a screw-free smooth surface structure.

11. The terminal according to claim 8, wherein the outer side of the lens is provided with at least one groove wrapping around the outer side of the lens, and the groove is filled with the adhesive.

12. The terminal according to claim 11, wherein the screw thread structure has a single-start or double-start thread form, wherein a thread type of the single-start or double-start thread form and a type of the groove comprise at least one of the following: a triangle, a rectangle, a trapezoid, a sawtooth, or a pipe thread.

13. The terminal according to claim 12, wherein a thread depth is greater than or equal to 0.2 millimeter and less than or equal to 0.5 millimeter.

14. The terminal according to claim 8, wherein the screw thread structure has at least one and at most five screw thread turns.

* * * * *